(12) United States Patent
Cone

(10) Patent No.: US 8,165,603 B2
(45) Date of Patent: *Apr. 24, 2012

(54) PERSONAL LOCATION CODE

(75) Inventor: Charles Francis Cone, Novato, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/067,353

(22) Filed: May 26, 2011

(65) Prior Publication Data

US 2011/0237278 A1    Sep. 29, 2011

Related U.S. Application Data

(63) Continuation of application No. 11/462,023, filed on Aug. 2, 2006, now Pat. No. 7,957,751.

(51) Int. Cl.
*H04W 24/00* (2009.01)
(52) U.S. Cl. .................. 455/456.2; 455/456.3; 455/410
(58) Field of Classification Search .................. 455/410, 455/411, 414.1, 404.1, 404.2, 456.1, 456.2, 455/456.3, 456.5, 456.6, 457, 466; 342/450, 342/457; 340/539.13, 825.36, 905, 995.19; 701/200, 201, 204, 207, 209, 211
See application file for complete search history.

(56) References Cited

U.S. PATENT DOCUMENTS

| | | |
|---|---|---|
| 5,508,707 A | 4/1996 | LeBlanc |
| 5,559,707 A | 9/1996 | DeLorme |
| 5,963,866 A | 10/1999 | Palamara |
| 6,091,956 A | 7/2000 | Hollenberg |
| 6,282,489 B1 | 8/2001 | Bellesfield |
| 6,490,522 B2 | 12/2002 | Sugiyama |
| 6,498,982 B2 | 12/2002 | Bellesfield |
| 6,510,379 B1 | 1/2003 | Hasegawa |
| 6,542,812 B1 | 4/2003 | Obradovich |
| 6,609,005 B1 | 8/2003 | Chern |
| 6,810,323 B1 | 10/2004 | Bullock |
| 6,868,410 B2 | 3/2005 | Fortin |
| 7,039,640 B2 | 5/2006 | Miller |
| 7,110,773 B1 | 9/2006 | Wallace |
| 7,286,931 B2 | 10/2007 | Kawasaki |
| 7,899,468 B2 * | 3/2011 | Lohtia et al. ............... 455/456.1 |
| 2002/0065604 A1 | 5/2002 | Sekiyama |

(Continued)

FOREIGN PATENT DOCUMENTS

DE    19953398    5/2001

(Continued)

OTHER PUBLICATIONS

"Toyota Prius Navigation," http://www.trilog.org/-chilcote?ToyotaPrius-nav.html, 2 webpages, downloaded Sep. 28, 2005.

(Continued)

*Primary Examiner* — Jean Gelin
(74) *Attorney, Agent, or Firm* — William H. Bollman

(57) ABSTRACT

Methods and apparatus, including computer program products, for receiving a request from a requestor to locate a user. The request identifies a personal location code (PLC) for the user. It is determined if the request is allowed based on the PLC. If the request is allowed, the current location of the user is obtained based on the location of one or more devices associated with the user. The current location of the device is then provided to the requestor.

17 Claims, 7 Drawing Sheets

U.S. PATENT DOCUMENTS

| | | | |
|---|---|---|---|
| 2002/0072848 A1 | 6/2002 | Hamada | |
| 2002/0145561 A1* | 10/2002 | Sandhu et al. | 342/357.09 |
| 2002/0173905 A1 | 11/2002 | Jin | |
| 2003/0008672 A1 | 1/2003 | Fujii | |
| 2003/0114171 A1 | 6/2003 | Miyamoto | |
| 2004/0127229 A1* | 7/2004 | Ishii | 455/456.1 |
| 2004/0132465 A1 | 7/2004 | Mattila | |
| 2004/0198339 A1 | 10/2004 | Martin | |
| 2004/0198386 A1 | 10/2004 | Dupray | |
| 2004/0203866 A1 | 10/2004 | Sahinoglu | |
| 2004/0203903 A1 | 10/2004 | Wilson | |
| 2004/0229601 A1 | 11/2004 | Zabawskyj | |
| 2005/0049785 A1 | 3/2005 | Vergin | |
| 2005/0137994 A1 | 6/2005 | Fortin | |
| 2005/0249172 A1 | 11/2005 | Malik | |
| 2005/0288859 A1 | 12/2005 | Golding | |
| 2006/0174329 A1* | 8/2006 | Dublish | 726/4 |
| 2006/0242307 A1 | 10/2006 | Jung | |
| 2006/0259237 A1 | 11/2006 | De Silva | |
| 2006/0265737 A1 | 11/2006 | Morris | |
| 2007/0061073 A1 | 3/2007 | Kuo | |
| 2007/0281689 A1 | 12/2007 | Altman | |
| 2011/0207429 A1* | 8/2011 | Maier et al. | 455/404.2 |

FOREIGN PATENT DOCUMENTS

| | | |
|---|---|---|
| EP | 1176840 | 1/2002 |
| EP | 1239392 | 9/2002 |
| GB | 2363289 | 12/2001 |

OTHER PUBLICATIONS

"Yahoo! Maps," http://maps/yahoo.com/maps_result?name+&addr+500+Arguello+S..., 1 webpage, downloaded Sep. 28, 2005.

"Google Maps," http://maps.google.com/, 1 webpage, downloaded Sep. 28, 2005.

"Magellan RoadMagte 760 North America," http://www.magellangps.com/en/products/product.asp?PRODID+1091, 3 webpages, downloaded Sep. 28, 2005.

"Yahoo! Driving Directions," http://maps.yahoo.com/pdd?ed-W.rUQOV.wil_AVMN266F518pW..., 2 webpages, downloaded Sep. 28, 2005.

U.S. Patent Application entitled "Landmark Enhanced Directions," U.S. Appl. No. 11/241,540, filed Sep. 30, 2005.

U.S. Patent Application entitled "Intelligent Reverse Geocoding," U.S. Appl. No. 11/367,911, filed Mar. 3, 2006.

U.S. Patent Application entitled "Location Sensitive Messaging," U.S. Appl. No. 11/437,041, filed Mar. 3, 2006.

U.S. Patent Application entitled "Personal: Location Code Broker" U.S. Appl. No. 11/462,015, filed Aug. 2, 2006.

Lin et al., "Exploiting a Search Engine to Develop More Flexible Web Agents," Web Intelligence, 2003, IEEE/WIC International Conference on Oct. 13, 2003, pp. 54-60.

International Search Report and Written Opinion from International Application No. PCT/US2007/061945 dated Jul. 17, 2007.

International Search Report and Written Opinion of the International Searching Authority, PCT Application Serial No. PCT/US2006/038554, Jan. 31, 2007, 12 pp.

International Search Report and Written Opinion for PCT Application No. PCT/US2007/75130, dated Jun. 27, 2008.

International Search Report and Written Opinion for PCT Application No. PCT/US2007/75123, dated Sep. 3, 2008.

Office Action for European Patent Application No. 06816086.0, dated Oct. 31, 2008.

International Search Report and Written Opinion for PCT Application No. PCT/US2007/069181, dated Sep. 11, 2007.

* cited by examiner

PERSONAL LOCATION CODE

The present application is a continuation of U.S. patent application Ser. No. 11/462,023, filed on Aug. 2, 2006 now U.S. Pat. No. 7,957,751, entitled "Personal Location Code", the entirety of which is expressly incorporated herein by reference.

BACKGROUND

FIG. 1 illustrates a prior art wireless network 100. The network 100 includes one or more devices 102 and 104. A device (e.g., a mobile phone, a portable computer) includes the ability to communicate through one or more wired or wireless networks with other devices. Companies or organizations that provide wireless and/or wired communication services to devices are termed "network operators" (e.g., 106 and 110). Communication links are established between base stations operated by network operators and devices via protocols such as Global System for Mobile communication (GSM) or Code Division Multiple Access (CDMA) which allow for the exchange of voice and data with other devices.

The network operators 106 and 110 can communicate through one or more wired or wireless networks 108 which allow the devices 102 and 104 to exchange messages. For example, the device 102 can send a message to the device 104 by way of the network operator 106. The network operator 106 can examine the message to determine the destination device 104 and then determine a destination network operator that is capable of delivering the message to the device 104 (e.g., network operator 110). The network operator 106 then forwards the message through the one or more networks 108 to the destination network operator 110 which in turns delivers the message to the device 104. Likewise, messages from the device 104 to the device 102 can be sent in a similar fashion.

Sometimes it is desirable to determine the location of a device, and hence the location of a user of that device. By way of illustration, if an application running on the device 102 seeks to determine the location of the device 104, the device 102 can send a location request message to the device 104 as described above. The device 104 or the network operator 110 can reply with a message containing the location of the device 104.

Typically, difficulties can arise with the message exchange if network operators do not use compatible message formats. Conflicts in message formats may result in, for instance, delayed or garbled messages (e.g., delayed or garbled location messages). Moreover, each network operator may use its own proprietary privacy rules for determining when to grant a request for location information. Incompatible privacy rules may result in users from one network not being able to locate users on a different network. Furthermore, network operators commonly do not share location information with third parties in order to protect the privacy of their customers.

Applications which handle location information, such as smart-phone applications or instant messaging applications, may encounter similar issues. Privacy is typically handled in one of two ways by conventional applications: blanket permission is given to requests for location information or applications are configured to ask the user every time the user's location is requested. Each of these methods has drawbacks; blanket permission may result in providing location information to undesirable parties while 'ask me' type permissions may result in excessive interruptions.

SUMMARY

In general, one aspect of the subject matter described in this specification can be embodied in a method that includes receiving a request from a requestor to locate a user. The request identifies a personal location code (PLC) for the user. It is determined if the request is allowed based on the PLC. If the request is allowed, the current location of the user is obtained based on the location of one or more devices associated with the user. The current location of the device is then provided to the requestor. Other embodiments of this aspect include corresponding systems, apparatus, and computer program products.

These and other embodiments can optionally include one or more of the following features. A PLC is a network-independent code for locating a user. Determining if a schedule allows use of the PLC at a time of the receiving. Determining if the current location of the user is private. Determining if the current location of the user is in a set of approved locations. Determining if the PLC has expired. Determining if the PLC is valid. Limiting the current location of the user to a predetermined granularity. Limiting the current location of the user to a predetermined description. Charging or debiting an account associated with the PLC for the request. Obtaining location information for two or more of the devices.

In general, another aspect of the subject matter described in this specification can be embodied in a method that includes obtaining a personal location code (PLC) for a user. A request is sent for the current location of the user to a user locator service. The request identifies the PLC. A response is received from the user locator service including the location of the user. The current location of the user is updated. Other embodiments of this aspect include corresponding systems, apparatus, and computer program products.

These and other embodiments can optionally include one or more of the following features. Tracking the location of each user in the one or more users over time. Tracking the time at each location for each user in the one or more users. A PLC is a network-independent code for locating a user.

Particular embodiments of the invention can be implemented to realize one or more of the following advantages. Users are given control over their location privacy. A personal location code determines who can locate a user and can also determine how and when a user can be located. Personal location codes allow privacy management to be removed from software applications and placed into a separate infrastructure that can potentially be used by any application and any network operator. Incompatible privacy rules are circumvented by use of personal location codes. Applications such as instant messaging and friend finders can use personal location codes to obtain the whereabouts of other users. Organizations can use personal location codes to track their members.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
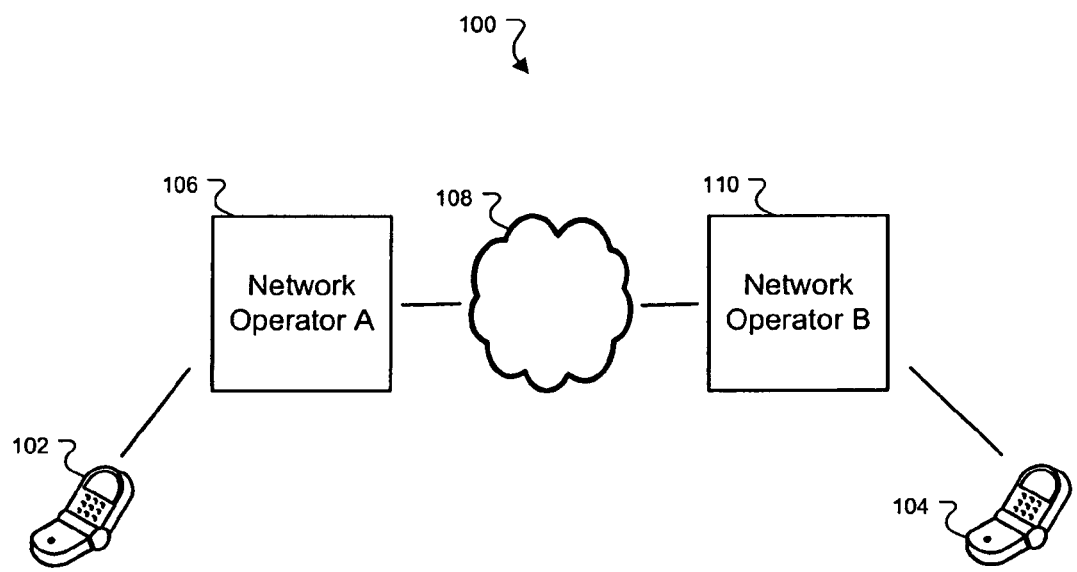
FIG. 1 illustrates a prior art network.
Figure 2:
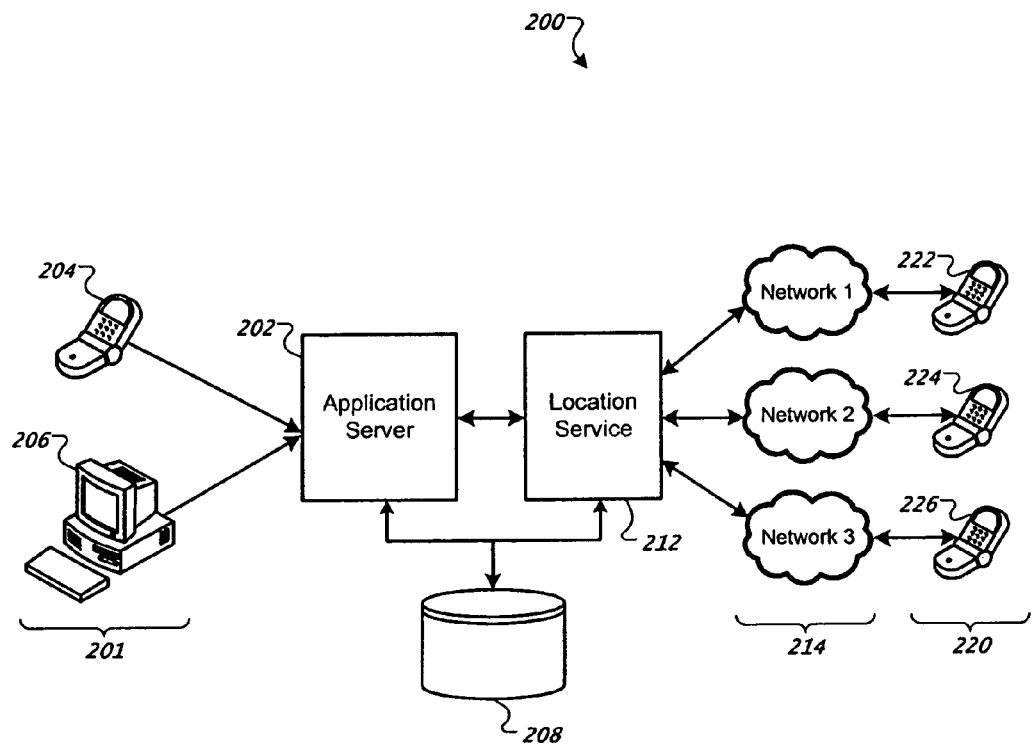
FIG. 2 illustrates a personal location code system.

FIG. 2 illustrates a personal location code (PLC) system 200. A PLC is a network-independent code for locating a user. The system 200 allows a user to make available a PLC which can be used by others to obtain the current location of the user based on the location of one or more devices associated with the user. In this way, users can control who is allowed to locate them. The PLC serves as a key to location privacy management that works across network operators and other systems that provide location information, for example. A PLC can include one or more letters, numbers, symbols, images, sounds, or other suitable representations. In one implementation, PLC codes are formatted to resemble phone numbers or other familiar, easy to remember patterns. Users can have more than one PLC and, in one implementation, users can select their own PLCs. This has the advantage of taking privacy management out of software applications and placing it into a separate infrastructure that can potentially be used with any application and with any network operator.

Users can provide their PLCs to others verbally or by electronic means such as e-mail, instant messaging, application-to-application communication, and other suitable means, for example. PLCs can be stored in devices (e.g., 204, 206, 222, 224, and 226) or in persistent storage (e.g., 208) accessible by an application server (e.g., 202) and a location service 212. The storage 208 can be implemented as one or more storage devices connected by one or more computer networks or other suitable communication means. The storage 208 can persist profile information for users of devices. A user profile can store or reference PLCs associated with the user, and the PLCs of other users. The user profile can also store or reference authorization conditions and constraint conditions which govern the semantics of the user's PLCs, as will be described below.

The application server 202 can provide application services to devices such as messaging (e.g., instant messaging, short messaging, picture messaging, friend finder), directory services (e.g., business locator, driving directions), tracking services (e.g., roadside assistance, child locator), and spatial alerts (e.g., find friends near me, find traffic near me, find traffic along a route), for example. A device is a mobile or non-mobile computing device such as, for example, a cellular telephone, a mobile computer, a personal digital assistant (e.g., Blackberry), a portable electronic game, a digital media player (e.g., Apple iPod), a personal or automobile navigation system, combinations of these, or other suitable devices.

In one implementation, a device sends a location request message containing a PLC associated with a target user to the application server 202 (e.g., as part of a utilizing a service) or to the location service 212. In one implementation, if the location request message does not contain a PLC, the PLC is obtained from the requesting user's profile (e.g., persisted in the storage 208) based on an identification of the target user in the location request message. In yet another implementation, if the location request message does not explicitly identify the target user, the target user's PLC is assumed to be unique in a set of PLCs and so a given PLC can be mapped to a specific target user.

If the location request was provided to the application server 202, the application server provides a location request along with the PLC to the location service 212. In one implementation, the location service 212 is a middleware platform that provides location determination services and, optionally, location message management, profile management, privacy management and geospatial capabilities. Applications served by the application server 202 can utilize the services provided the location service 212.

The location service 212 verifies whether the PLC can be used to locate the target user and determines which network (e.g., network 1, 2 or 3) a device associated with the target user (e.g., the user's cell phone) is registered with. In one implementation, a target user can have more than one associated device such as, for example, a primary cell phone and a secondary or backup cell phone. The location service 212 contacts a network operator for the network using a protocol compatible with the network operator to obtain the location of the device from the network operator. In one implementation, the location service 212 contacts the device itself to obtain the device's location. If the network operator or the device cannot provide the device's location, the location service 212 can provide a default location based on information in the target user's profile. For example, a target user's profile may specify that the default location between the hours of 9:00 AM and 5:00 PM is the target user's work address. Alternatively, the location service 212 can attempt to locate another device associated with the target user (e.g., a secondary device) if the first device cannot be located. The location service 212 then provides the alternate device's location (which serves as the user's current location) to the application server 202 or the requesting device.

There can be fewer or more components than those illustrated in FIG. 2. Moreover, the components can be distributed across one or more computing systems connected by one or more networks or other suitable means. For example, the application server 202 and the location service 212 can reside on separate computer systems connected by one or more public or private networks. And although the system is described in terms of client and server, other architectures are possible including peer-to-peer.

Figure 3:
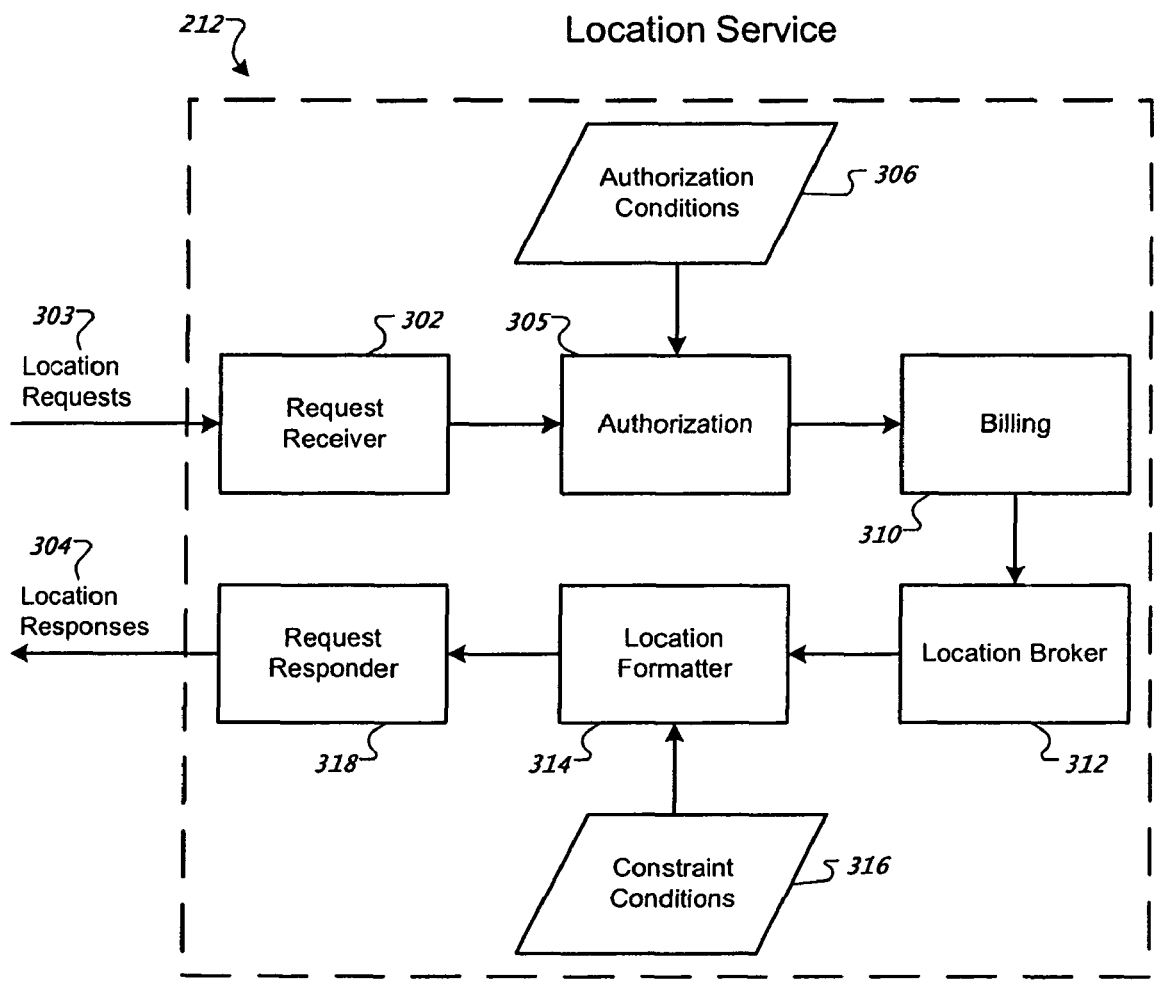
FIG. 3 is a system diagram illustrating components of a location service.

FIG. 3 is a system diagram illustrating logical components of the location service 212. A request receiver component 302 accepts location request messages 303 for processing. Location request messages 303 can incorporate or identify one or more PLCs associated with one or more target users who are to be located. In one implementation, a location request message can be broken into one or more sub messages which can each be received independently by the request receiver 302 and reassembled into a complete message. The request receiver 302 provides the location request message to an authorization component 305 which determines whether or not the request should be granted based on one or more authorization conditions 306 associated with the target user's profile. TABLE 1 describes exemplary authorization conditions and their associated effects. Other authorization conditions are possible. If more than one authorization condition applies to a PLC, all of the results must be Grant in order for the location request to be granted. Each PLC can have its own authorization conditions. In this way, users can control who is allowed to locate them and when.

TABLE 1

| AUTHORIZATION CONDITION | DESCRIPTION | RESULT |
| --- | --- | --- |
| Is the PLC valid? | For example, an invalid PLC may not be associated with any target user, or with a target user who has rescinded the PLC. | Grant if valid, otherwise do not grant. |
| Is the location request allowed at this time? | For example, a target user may restrict use of a PLC to certain days and times. | Grant if the location request is currently allowed, otherwise do not grant. |
| Has the PLC expired? | For example, a target user can set an expiration date for a PLC. | Grant if the PLC has not expired, otherwise do not grant. |
| Is the requesting user authorized to make the location request? | For example, the requesting user may not have the appropriate privileges in order to make the location request. | Grant if the requesting user is authorized, otherwise do not grant. |
| No PLC is specified in the request or a special emergency PLC specified in request. | For example, law enforcement or other emergency personal may need to locate a user in time of emergency. | Grant if the target user has authorized such requests. |

In one implementation, if no PLC is identified in the location request message 303 or a special emergency PLC is identified in the request message 303, the location of the target user will be provided to the requestor if the requestor has been authorized by the target user. For example, the requestor may be law enforcement or emergency services personal that need to locate the target user in an emergency situation. Target users can authorize such location requests as part of signing up for the PLC service, for example.

In one implementation, a billing component 310 can apply charges to an account associated with a requestor, target user, a PLC, or combinations of these, for use of a PLC. For example, PLCs could be used to authorize 'x' number of location requests at 'y' cents per transaction, using a credit card or other payment scheme. Loyalty programs, commerce offers, and other types of promotions could be enabled by the billing component 310. The billing component 310 can also detect fraudulent use of a PLC. If there are a large number of location requests for a given PLC in a short amount of time, for instance, the billing component 310 can make the location service 212 aware so that measures can be taken to disable the PLC or alert the target user.

A location broker component 312 receives a request from a system 212 component (e.g., the billing component 310) to locate the target user based on the PLC, and attempts to locate a target user by locating a device associated with the target user. (Presumably, the target user has the device on their person or is near the device so that the location of the device corresponds to the location of the target user.) The PLC is associated with one or more devices for the target user. In one implementation, a database is used to associate a PLC with one or more devices. The database can also identify a network operator for each device and device information such as the device type and capabilities.

In one implementation, the associated devices can be ranked such that the location broker 312 will attempt to locate higher ranked devices before locating lower ranked devices. For example, if there is a primary device (e.g., rank=1) and a secondary device (e.g., rank=2) associated with a PLC, the location broker 312 will attempt to locate the primary device first. If the primary device cannot be located (e.g., the primary device is turned off or no location is available), the location broker 312 will attempt to locate the secondary device, and so on.

In another implementation, rules or heuristics can be used to select which device to locate. For example, one type of rule could select the device that is most likely to be turned on or be located near the user based on the time of day. This type of rule could be used to recognize that users may primarily use one device during working hours and a different device outside of work. Another type of rule could select a device based on the type of device, such as whether the device is a cell phone or a media player. A further type of rule could select a device based on the latency or speed of the response to a location request by the location broker 312.

Yet another type of rule could select a device based on an assessment of the accuracy of location information coming from the device (if the device is communicated with directly) or from the device's associated network operator. Typical network operators use various approaches for determining the location of a device, depending on the information that is available. One high accuracy approach actives a Global Positioning System (GPS) receiver in the device in order to develop a reasonably precise location of the device at a point in time. Another approach with low accuracy maps the cellular tower that a device is using (e.g., based on signal strength) to a geographic region. An intermediate approach uses one or more last known GPS location(s) to determine a location of the device based on an estimated trajectory. (In one implementation, the location broker 312 can cache location information for a device for use in the event that a user's location information cannot be obtained, to improve responsiveness, or a combination of these.)

In one implementation, the location broker 312 can contact the selected device directly to obtain the device's current location using a communication protocol appropriate for the device. In another implementation, the location broker 312 communicates with the device's network operator using a protocol appropriate for the network operator. In a sense, the location broker 312 acts as a communication multiplexer between a requestor and the network operators for devices associated with the PLC. Protocol adapter components can be used by the location broker to translate location requests into a protocol acceptable to a given network operator. In one implementation, the location broker 312 can communicate with a network operator using the Open Mobile Alliance Mobile Location Protocol (OMA MLP) which is an application-level protocol for obtaining the position of devices independent of underlying network technology. The OMA MLP specification is available from the Open Mobile Alliance located in La Jolla, Calif.

A location formatter component 314 formats the location information provided by the location broker 312, if any (i.e., the location broker 312 may not have been able obtain the location information). Location information can be provided to requesting applications in different formats. TABLE 2 presents four possible formats, however others are possible. A target user's profile may dictate which location format should be provided to applications that request the target user's location. The last location format indicates to the requestor that there was not a device associated with the PLC that was turned on.

TABLE 2

| LOCATION FORMAT | EXAMPLE OF LOCATION RESULT |
| --- | --- |
| At specific location | "At 323 Cole Street, San Francisco, CA" |
| Within distance of intersection | "Within 1.3 kilometers of Cole St. and Carl St." |
| At Point of Interest | "At Davies Medical Center" |
| Within distance of Point of Interest | "Within 3 miles of Deboce Park" |
| Locate failed: message | "Locate failed: user's device is turned off." |
| City name or Neighborhood name | "In Los Angeles" or "In Belmont" |

Location information can also be subject to constraint conditions 316. A constraint condition 316 can be used by the location formatter 314 to determine the type of location information that is returned to the requestor. Exemplary constraint conditions are detailed in TABLE 3, but others are possible.

TABLE 3

| CONSTRAINT CONDITION | RESULT |
| --- | --- |
| Is the target user's current location approved for dissemination? | Provide the location if approved, otherwise provide no location or a default location. |
| Is the target user's current location of the proper granularity (e.g., too much detail)? | If not, limit the current location of the target user to a predetermined granularity. |
| Is the target user's current location to be mapped to a predetermined description? | If so, map the location to the predetermined description (e.g., "at work", "at home"). |

If the target user's location is not approved for dissemination, a default location can be provided (or no location). For example, a target user can specify for a given PLC that between the hours of 6:00 PM and 5:00 AM their location is private. Another condition has to do with the granularity of location information. Target users may wish to limit knowledge of their location to the level of a city, county, or state, for instance, rather than an exact location. Finally, a constraint condition associated with a PLC can map one or more locations to predetermine descriptions such "home", "work", "out of the office", "on the road", and "unavailable", for example. Once constrain conditions 316, if any, are applied to the location result, the request responder component 318 can return the location information to the requesting application.

Figure 4A:
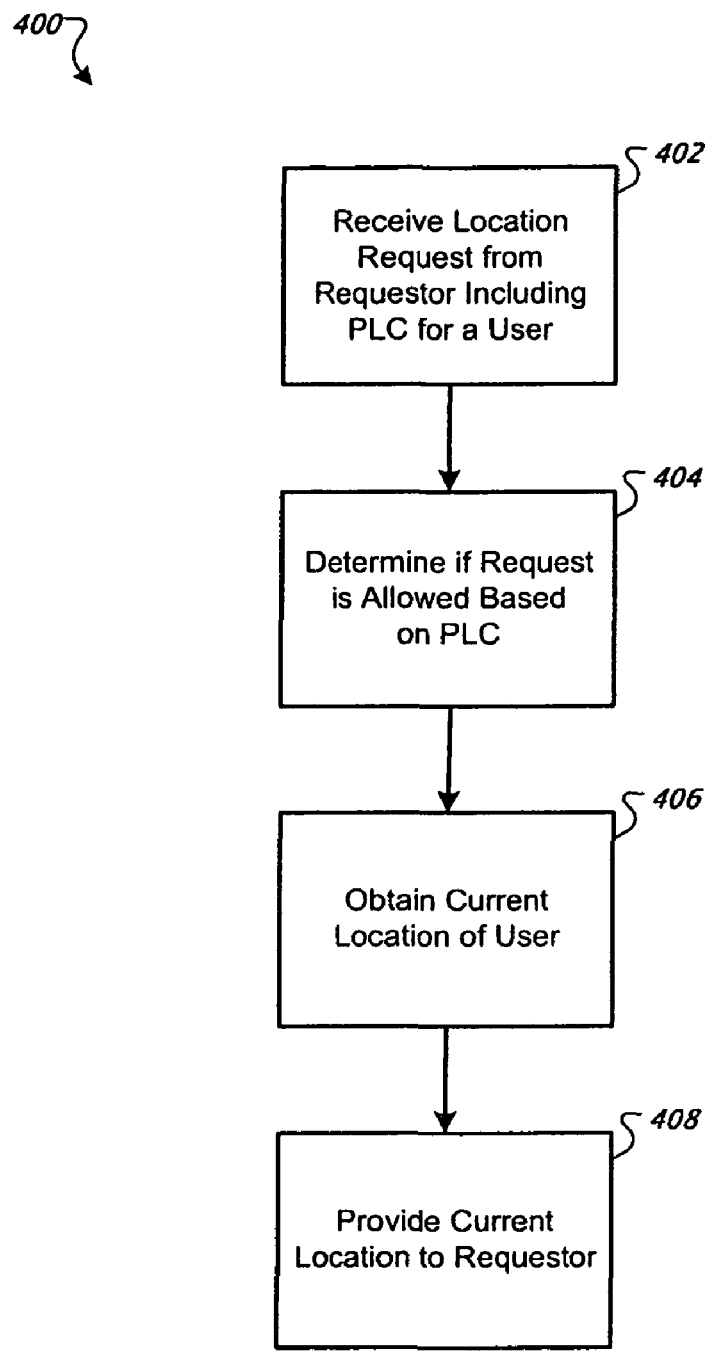
FIG. 4a is a flow chart illustrating a method for processing a location request.

FIG. 4a is a flow chart illustrating a method 402 for processing a location request. A location request message including or referring (directly or indirectly) to a PLC is received from a requesting application (step 402). For example, the location request message can be received by the request receiver component 302. It is then determined whether the location request is allowed (e.g., based on the PLC; step 404). In one implementation, this determination can be made by the authorization component 305. If the location request is allowed, the current location of a target user associated with the PLC is obtained by the location broker 312, as described above (step 406). The current location of the user is then provided to the requesting application (step 408) by the request responder component 318, for example.

Figure 4B:
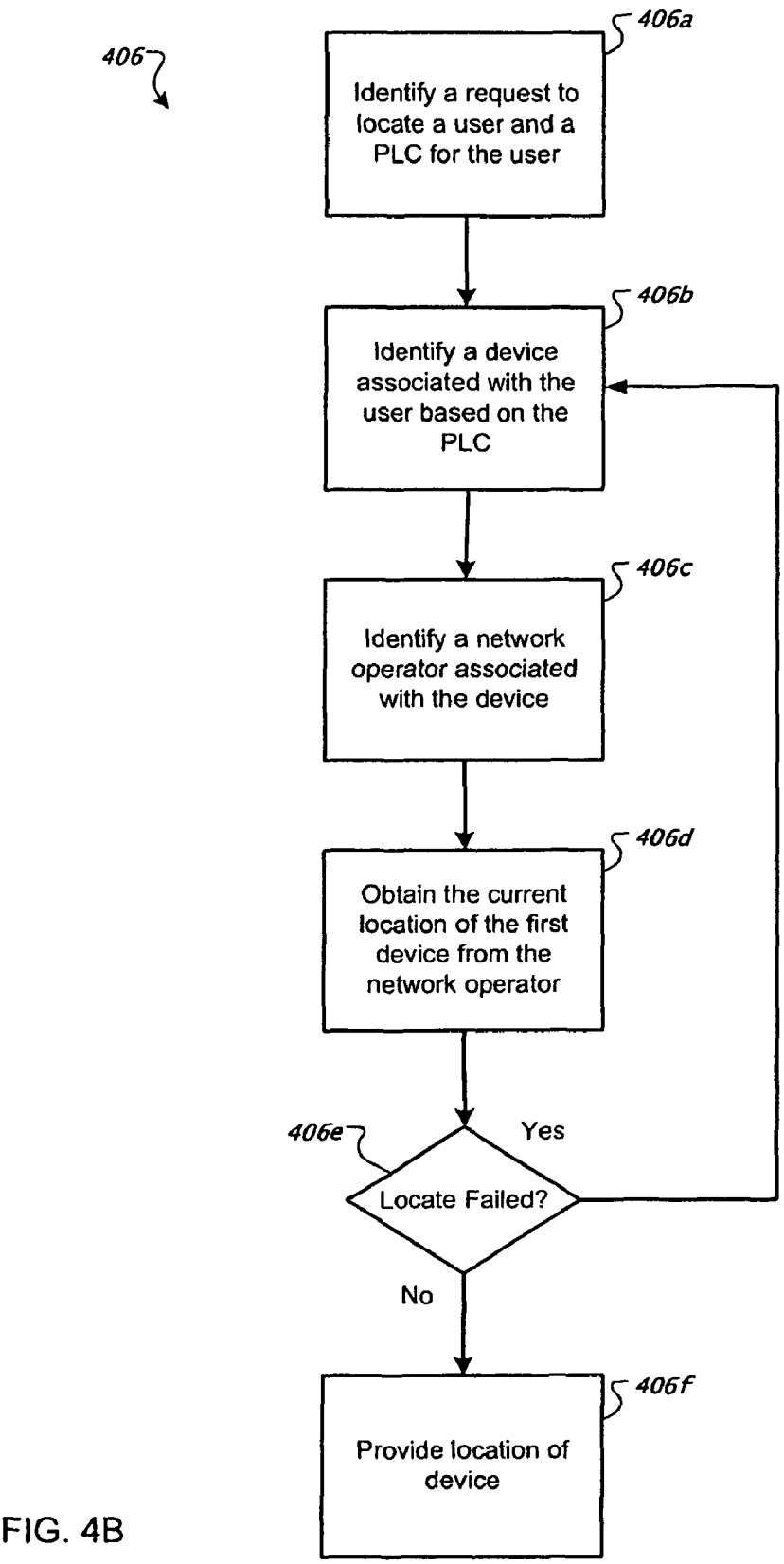
FIG. 4b is a flow chart illustrating a method for obtaining a location.

FIG. 4b is a flow chart illustrating in further detail step 406 from FIG. 4a. A request to locate a user including or referring (directly or indirectly) to a PLC is provided to the location broker 312 (step 406a). A device associated with the target user (based on the PLC) is identified (e.g., based on device rank, rules or other criteria; step 406b). There may be only one device associated with the user. A network operator associated with the device is identified (step 406c). The location of the device is obtained from the network operator (step 406d). If the location could not be obtained from the network operator (step 406e), another device is identified at step 406b and the process repeats. Otherwise, the location of the device is provided by the location broker 312 to one or more other components in the system 212 (step 406f).

Figure 5:
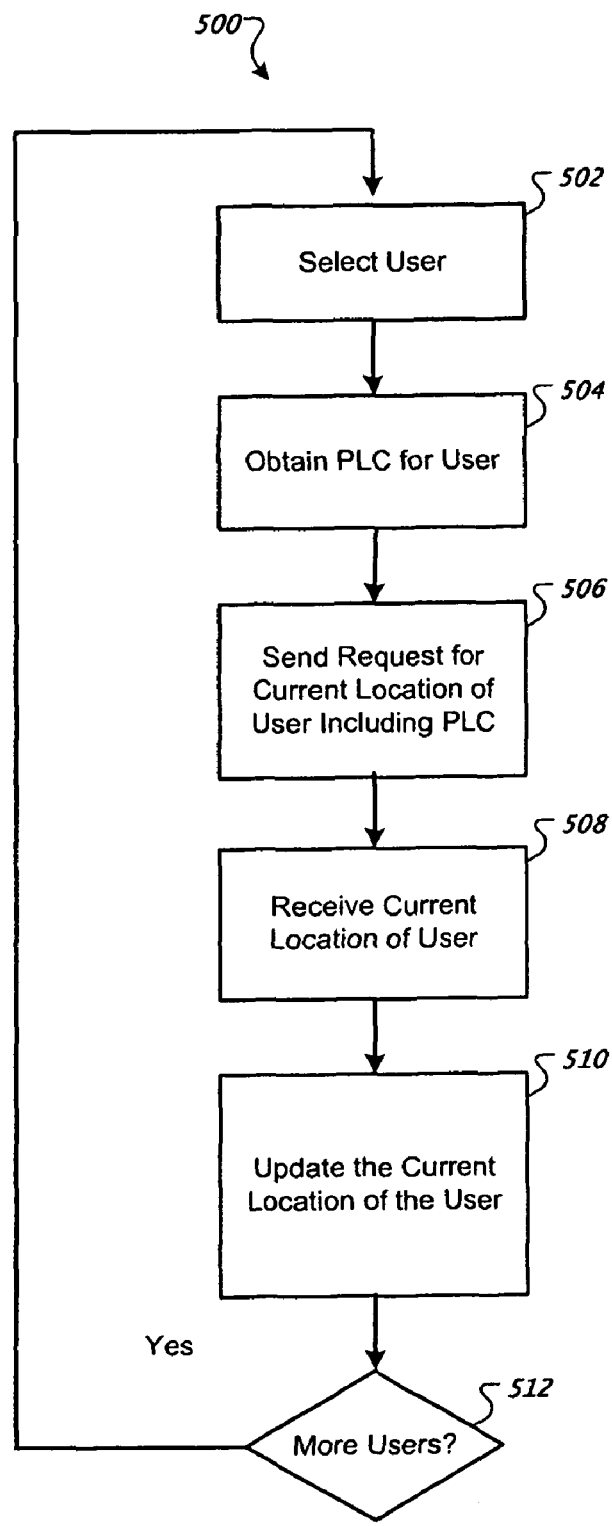
FIG. 5 is a flow chart illustrating a method for obtaining the location of users.

FIG. 5 is a flow chart illustrating a method 500 for obtaining the location of users. A user to be located is selected (step 502). For example, an application such as an employee location tracker might select an employee to locate. A PLC is obtained for the user (step 504). By way of illustration PLC could be stored in a local file or database, or the PLC can be obtained from a web service or an application server. A request for the location of the user including the user's PLC is provided to the application server 202 or to the location service 212 (step 506). The current location of the user is received (step 508) and the current location of the user is updated (step 510). Continuing with the example, the employee location tracker can update a database record associated with the user to reflect the user's current location. If there are more users to track, the method continues at step 502 (step 512).

Figure 6:
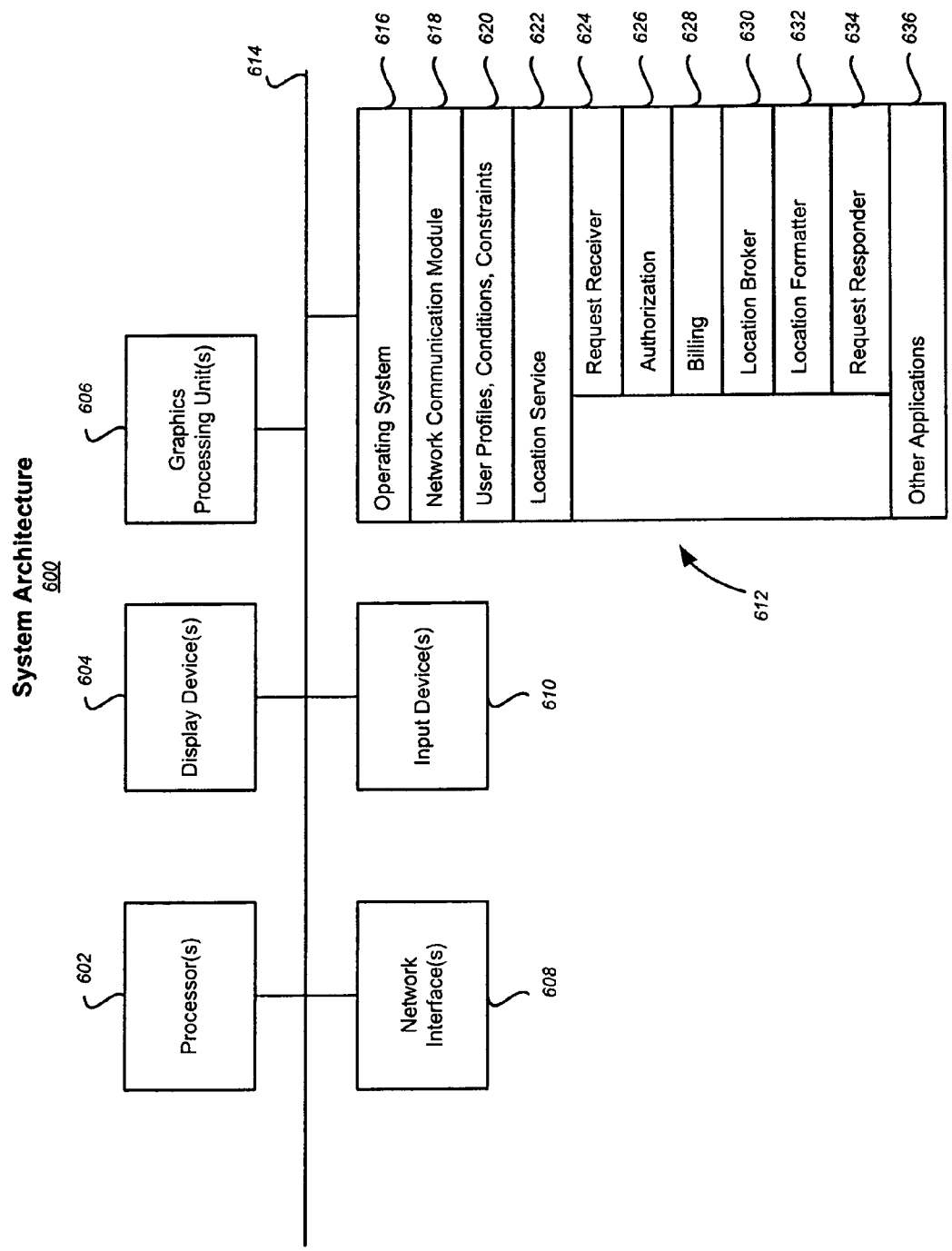
FIG. 6 is a block diagram of an exemplary system architecture.

FIG. 6 is a block diagram of an exemplary system architecture 600 for hosting the personal location code service 212. The architecture 600 includes one or more processors 602 (e.g., IBM PowerPC®, Intel Pentium® 4, etc.), one or more display devices 604 (e.g., CRT, LCD), one or more graphics processing units 606 (e.g., NVIDIA® Quadro FX 4500, GeForce® 7800 GT, etc.), one or more network interfaces 608 (e.g., Ethernet, FireWire, USB, etc.), one or more input devices 610 (e.g., keyboard, mouse, etc.), and one or more computer-readable mediums 612 (e.g. SDRAM, optical disks, hard disks, flash memory, L1 or L2 cache, etc.). These components exchange communications and data via one or more buses 614 (e.g., EISA, PCI, PCI Express, etc.).

The term "computer-readable medium" refers to any medium that participates in providing instructions to a processor 602 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 612 further includes an operating system 616 (e.g., Mac OS®, Windows®, Linux, etc.), a network communication module 618, one or more user profiles, authorization conditions and constraint conditions 620. The location service 622 further includes a request receiver component 624, an authorization component 626, a billing component 628, a location broker component 630, a location formatter component 632, and a location request responder 634. Other applications 636 can include any other applications residing on the system 600, including an application server 202 as described above.

The operating system 616 can be multi-user, multiprocessing, multitasking, multithreading, real-time and the like. The operating system 616 performs basic tasks, including but not limited to: recognizing input from input devices 610; sending output to display devices 604; keeping track of files and directories on computer-readable mediums 612 (e.g., memory or a storage device); controlling peripheral devices (e.g., disk drives, printers, GPUs 606, etc.); and managing traffic on the one or more buses 614. The network communications module 618 includes various components for establishing and maintaining network connections (e.g., software for implementing communication protocols, such as TCP/IP, HTTP, Ethernet, etc.).

The system architecture 600 can be implemented in any electronic or computing device, including but not limited to: portable or desktop computers, workstations, main frame computers, network servers, etc. Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method of controlling access to location information, comprising:
    receiving, at a location server, a plurality of location requests to locate a target device, said plurality of location requests comprising a unique personal location code (PLC) that is distinct from identification information associated with a requesting device and distinct from identification information associated with said target device;
    obtaining a current location of said target device; and
    if said unique PLC is determined to be a valid PLC and a number of said plurality of location requests is less than a predetermined maximum number, providing said current location of said target device to said requesting device.

2. The method of controlling access to location information according to claim 1, further comprising:
    determining if said current location of said target device is private.

3. The method of controlling access to location information according to claim 1, further comprising:
    determining if said current location of said target device is in a set of approved locations.

4. The method of controlling access to location information according to claim 1, further comprising:
    determining if said unique received PLC has expired.

5. The method of controlling access to location information according to claim 1, further comprising:
    if said plurality of location requests is more than said predetermined maximum number, alerting said target device.

6. The method of controlling access to location information according to claim 1, further comprising:
    limiting said current location of said target device to a predetermined granularity.

7. The method of controlling access to location information according to claim 1, further comprising:
    limiting said current location of said target device to a predetermined description.

8. The method of controlling access to location information according to claim 1, further comprising:
    at least one of charging and debiting an account associated with said unique received PLC for said request.

9. The method of controlling access to location information according to claim 1, further comprising:
    obtaining location for at least two target devices.

10. A method of controlling access to location information, comprising:
    receiving, from a requesting device, a plurality of location requests comprising a unique personal location code (PLC), said received unique PLC being distinct from identification information associated with said requesting device and distinct from identification information associated with a target device;
    sending said location request for a current location of said target device to a user device locator service; and
    if said received unique PLC is determined to be a valid PLC and a number of said plurality of location requests is less than a predetermined maximum number, providing location information associated with said target device to said requesting device.

11. The method of controlling access to location information according to claim 10, further comprising:
    tracking said current location of said target device over time.

12. The method of controlling access to location information according to claim 10, further comprising:
    tracking a time at said current location for said target device.

13. The method of controlling access to location information according to claim 10, further comprising:
    determining if said current location of said target device is private.

14. The method of controlling access to location information according to claim 10, further comprising:
    determining if said current location of said target device is in a set of approved locations.

15. The method of controlling access to location information according to claim 10, further comprising:
    determining if said unique received PLC has expired.

16. The method of controlling access to location information according to claim 10, further comprising:
    if said plurality of location requests is more than said predetermined maximum number, alerting said target device.

17. The method of controlling access to location information according to claim 10, further comprising:
    limiting said current location of said target device to a predetermined granularity.

* * * * *